(12) United States Patent
Wang et al.

(10) Patent No.: US 12,726,148 B2
(45) Date of Patent: Sep. 1, 2026

(54) MOTOR CONTROL SYSTEM

(71) Applicant: Delta Electronics, Inc., Taoyuan (TW)

(72) Inventors: Hsi-Hsiang Wang, Taoyuan City (TW); Chung-Wen Yu, Taoyuan City (TW); Chia-Ju Chang, Taoyuan City (TW); Po-Sung Chiang, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 240 days.

(21) Appl. No.: 18/768,975

(22) Filed: Jul. 10, 2024

(65) Prior Publication Data

US 2025/0350228 A1 Nov. 13, 2025

(30) Foreign Application Priority Data

May 8, 2024 (CN) ........................ 202410564083.0

(51) Int. Cl.
*H02P 27/06* (2006.01)

(52) U.S. Cl.
CPC .................................. *H02P 27/06* (2013.01)

(58) Field of Classification Search
CPC ............ H02P 27/06; H02P 27/04; H02P 3/18
USPC ................................................ 318/503, 494
See application file for complete search history.

(56) References Cited

U.S. PATENT DOCUMENTS 9,209,718 B2 * 12/2015 Sykes ................. H02H 7/0844
2016/0241174 A1 8/2016 Hisamatsu et al.

FOREIGN PATENT DOCUMENTS

| | | | |
|---|---|---|---|
| CN | 105576952 | A | 5/2016 |
| CN | 111404423 | A | 7/2020 |
| CN | 112947387 | A | 6/2021 |
| CN | 113965056 | A | 1/2022 |
| CN | 116404614 | A | 7/2023 |
| JP | 2013192414 | A | 9/2013 |
| TW | 202103434 | A | 1/2021 |

* cited by examiner

*Primary Examiner* — David Luo
(74) *Attorney, Agent, or Firm* — KIRTON McCONKIE; Evan R. Witt

(57) ABSTRACT

A motor control system includes a first STO circuit, a second STO circuit and a pulse control module. The first STO circuit includes a first filter circuit, a first STO switch, a first photocoupler circuit and a second photocoupler circuit. The first and second photocoupler circuits are connected in series. The first STO switch and the first filter circuit are connected with the first photocoupler circuit. The second STO circuit includes a second filter circuit, a second STO switch, a third photocoupler circuit and a fourth photocoupler circuit. The third and fourth photocoupler circuits are connected in series. The second STO switch and the second filter circuit are connected with the third photocoupler circuit. The pulse control module issues a pulse signal to the second and the fourth photocoupler circuits and detects whether the first or the second STO circuit is abnormal.

13 Claims, 4 Drawing Sheets

MOTOR CONTROL SYSTEM

CROSS-REFERENCE TO RELATED APPLICATION

This application claims priority to China Patent Application No. 202410564083.0 filed on May 8, 2024, the entire contents of which are incorporated herein by reference for all purposes.

FIELD OF THE INVENTION

The present invention relates to the field of a motor, and more particularly to a motor control system.

BACKGROUND OF THE INVENTION

A safe torque off (STO) circuit can be applied in a motor control system. When the motor control system needs to be shut down for maintenance or a danger occurs and the emergency braking action is required, the safe torque off function can shut down the motor control system safely without the need of cutting off the main power supply. Moreover, due to the safe torque off function, the motor control system does not need to be powered on again when the motor control system is restarted. Consequently, the production efficiency is largely enhanced. In the existing motor control systems, dual-channel designs are mostly used for safe torque off circuits to perform redundant control function.

However, after the long-term operation, some components of the safe torque off circuit and the motor control system are possibly damaged, which results in the safety function failure. In order to avoid these drawbacks, some of the existing motor control systems are also equipped with self-detection circuits. In order to achieve a timing synchronization control mechanism, the self-detection circuit needs to have two switches to cooperate with the timing synchronization control. The two switches are electrically connected with the safe torque off circuits according to the dual-channel designs. In case that the self-detection circuit does not receive an external triggering signal, the two switches are turned on, and the motor control system and the safe torque off circuit are operated normally. Whereas, in case that the self-detection circuit receives an external triggering signal, the self-detection circuit performs a self-detection operation on the motor control system and turns off the two switches at the same time. Consequently, the electrical short circuit and misjudgment of the self-detection mechanism caused by the asynchronous timing condition of the external triggering signal are avoided.

Since the self-detection circuit of the above-mentioned motor control system needs to use two switches and design the timing synchronization mechanism, the production cost of the motor control system is high.

Therefore, there is a need of providing an improved motor control system in order to overcome the drawbacks of the conventional technologies.

SUMMARY OF THE INVENTION

The present invention provides a motor control system with reduced production cost.

In accordance with an aspect of the present invention, a motor control system is provided for driving a motor. The motor control system includes a variable-frequency drive, a first safe torque off (STO) circuit, a second STO circuit and a pulse control module. The variable-frequency drive is electrically connected with the motor. The variable-frequency drive includes a first driving unit and a second driving unit. When the first driving unit or the second driving unit is enabled, the variable-frequency drive provides an AC power to the motor. The first STO circuit includes a first filter circuit, a first STO switch, a first photocoupler circuit and a second photocoupler circuit. The first filter circuit is electrically connected with the first photocoupler circuit. The first STO switch is electrically connected with the first driving unit and a phototransistor of the first photocoupler circuit. A photodiode of the first photocoupler circuit and a phototransistor of the second photocoupler circuit are connected with each other in series. The second STO circuit includes a second filter circuit, a second STO switch, a third photocoupler circuit and a fourth photocoupler circuit. The second filter circuit is electrically connected with the third photocoupler circuit. The second STO switch is electrically connected with the second driving unit and a phototransistor of the third photocoupler circuit. A photodiode of the third photocoupler circuit and a phototransistor of the fourth photocoupler circuit are connected with each other in series. The pulse control module is electrically connected with a photodiode of the second photocoupler circuit and a photodiode of the fourth photocoupler circuit. The pulse control module issues a pulse signal to the photodiode of the second photocoupler circuit and the photodiode of the fourth photocoupler circuit and detects whether the first STO circuit or the second STO circuit is abnormal, wherein the pulse signal is switched between a high voltage level state and a low voltage level state. When the pulse control module issues the pulse signal in the high voltage level state, the second photocoupler circuit and the fourth photocoupler circuit are turned on, the motor control system is operated in a STO trigger mode. When the pulse control module issues the pulse signal in the low voltage level state, the second photocoupler circuit and the fourth photocoupler circuit are turned off, the motor control system is operated in a STO self-test mode.

From the above descriptions, the present invention provides the motor control system. In the first STO circuit of the motor control system, the photodiode of the first photocoupler circuit and the phototransistor of the second photocoupler circuit are connected with each other in series. In the second STO circuit of the motor control system, the photodiode of the third photocoupler circuit and the phototransistor of the fourth photocoupler circuit are connected with each other in series. Consequently, in the STO trigger mode or the STO self-test mode, the pulse control module issues the corresponding pulse signal to directly control the on/off states of the second photocoupler circuit and the on/off states of the fourth photocoupler circuit. In comparison with the conventional motor control system, the motor control system of the present invention does not need an additional timing synchronization mechanism and two self-detection circuits. Consequently, the production cost of the motor control system of the present invention is reduced. Moreover, since the motor control system does not need to consider the statuses of the first STO control signal and the second STO control signal, the electrical short circuit and the misjudgment of the motor control system when executing the safe torque off function are avoided.

The above contents of the present invention will become more readily apparent to those ordinarily skilled in the art after reviewing the following detailed description and accompanying drawings, in which:

BRIEF DESCRIPTION OF THE DRAWINGS

FIG. 2 is a schematic circuit diagram illustrating the architecture of the motor control system shown in FIG. 1 when the second photocoupler circuit and the fourth photocoupler circuit are turned on;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
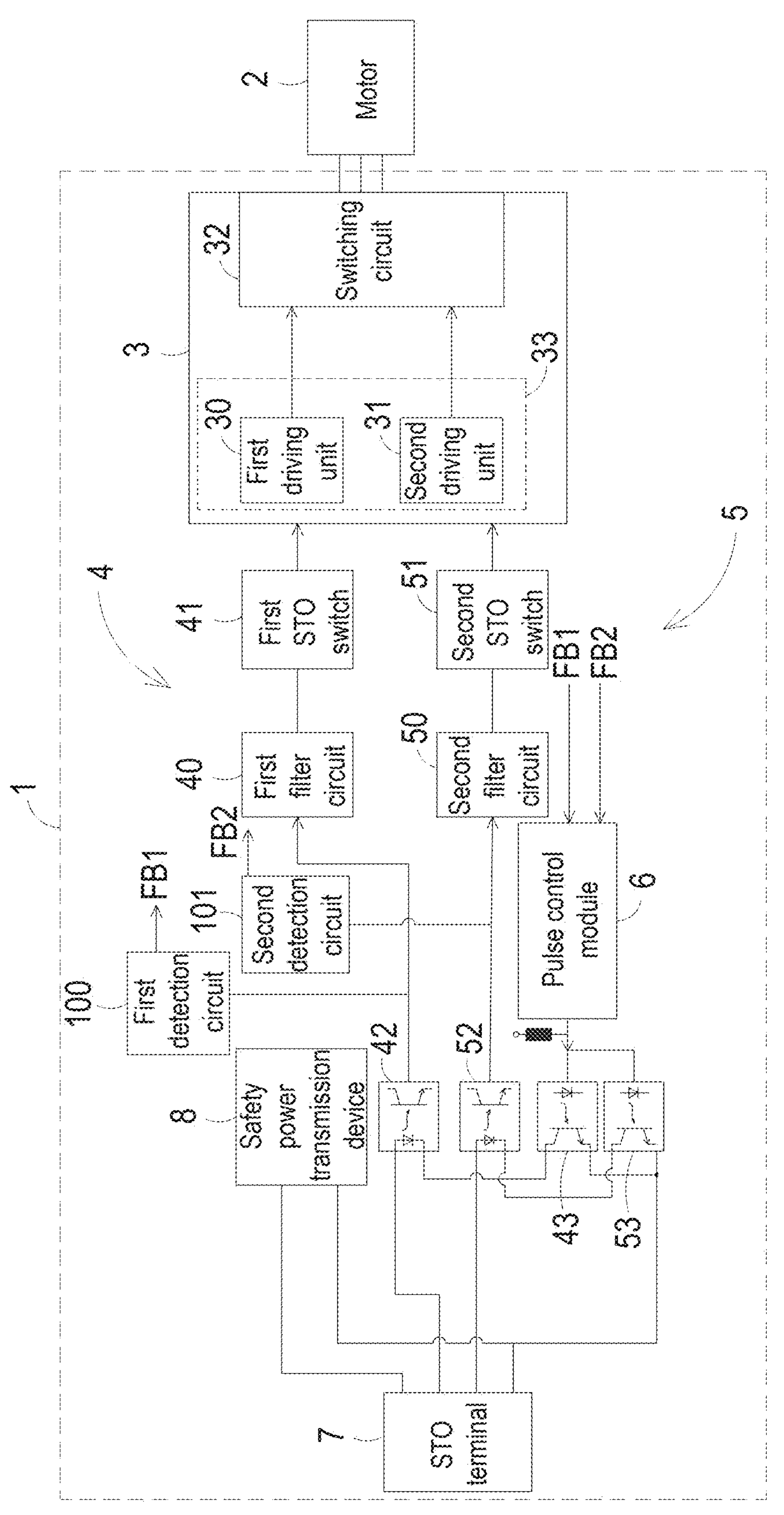
FIG. 1 is a schematic circuit diagram illustrating the architecture of a motor control system according to an embodiment of the present invention.
Figure 2:
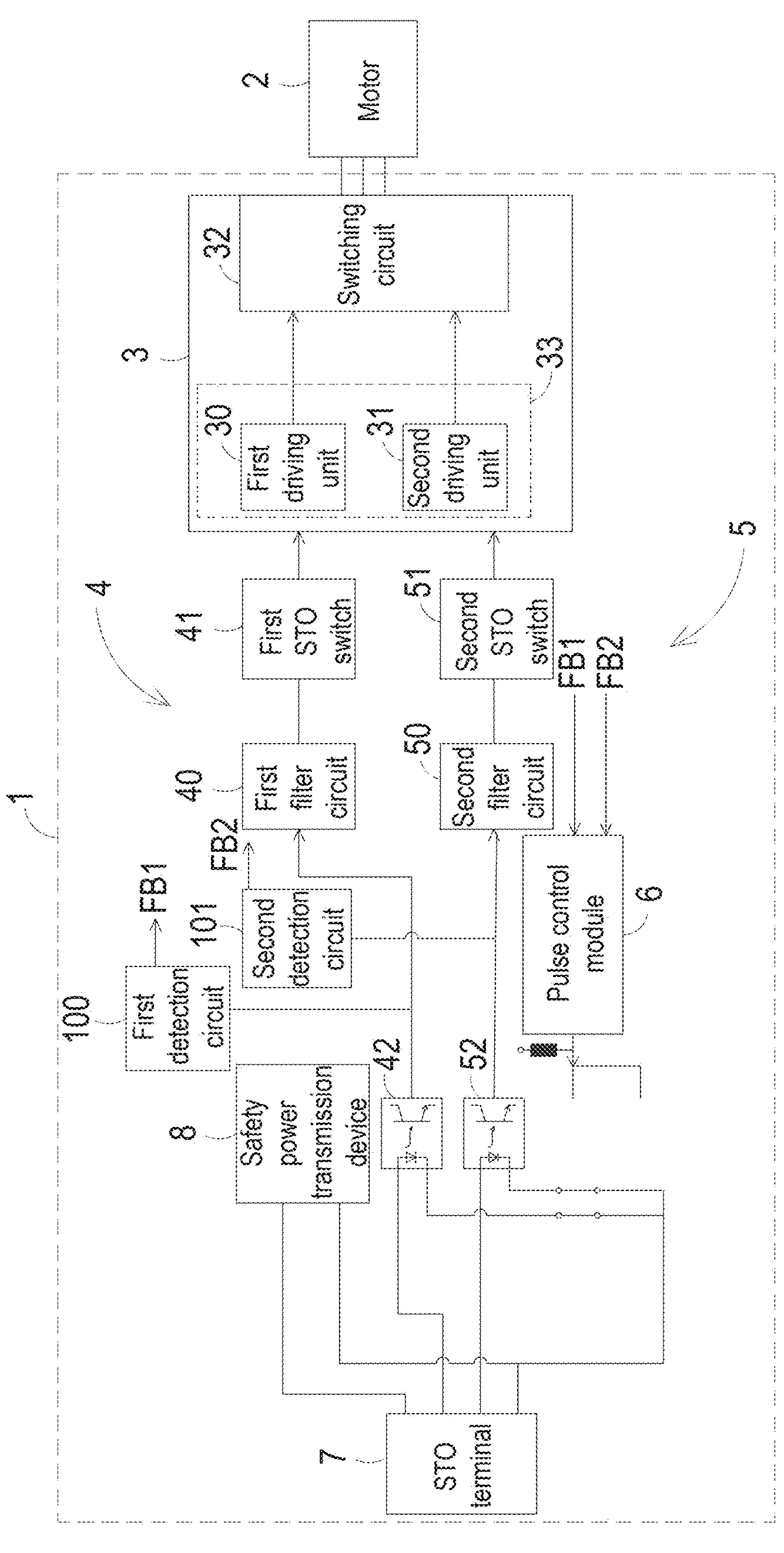
Figure 3:
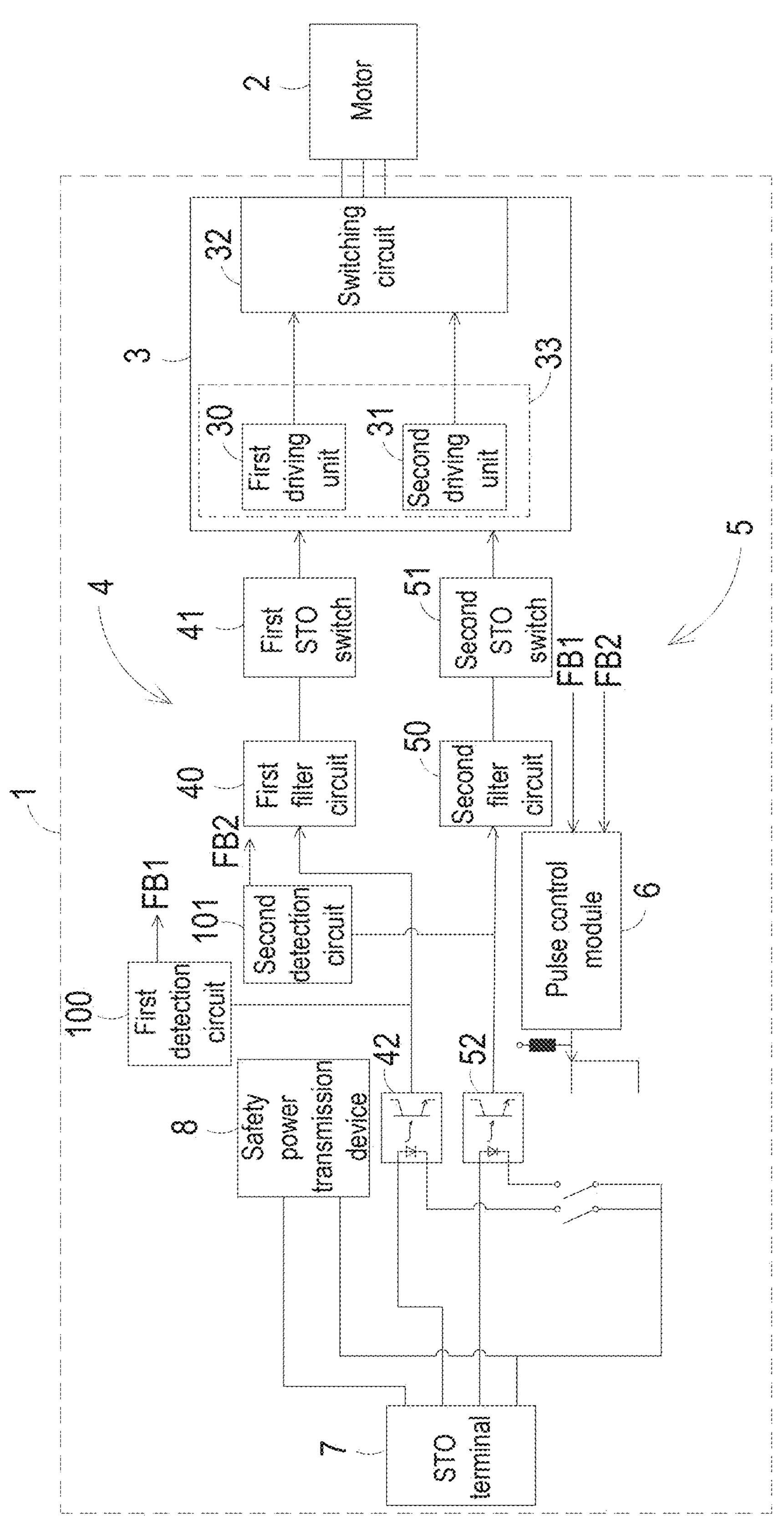
FIG. 3 is a schematic circuit diagram illustrating the architecture of the motor control system shown in FIG. 1 when the second photocoupler circuit and the fourth photocoupler circuit are turned off.
Figure 4:
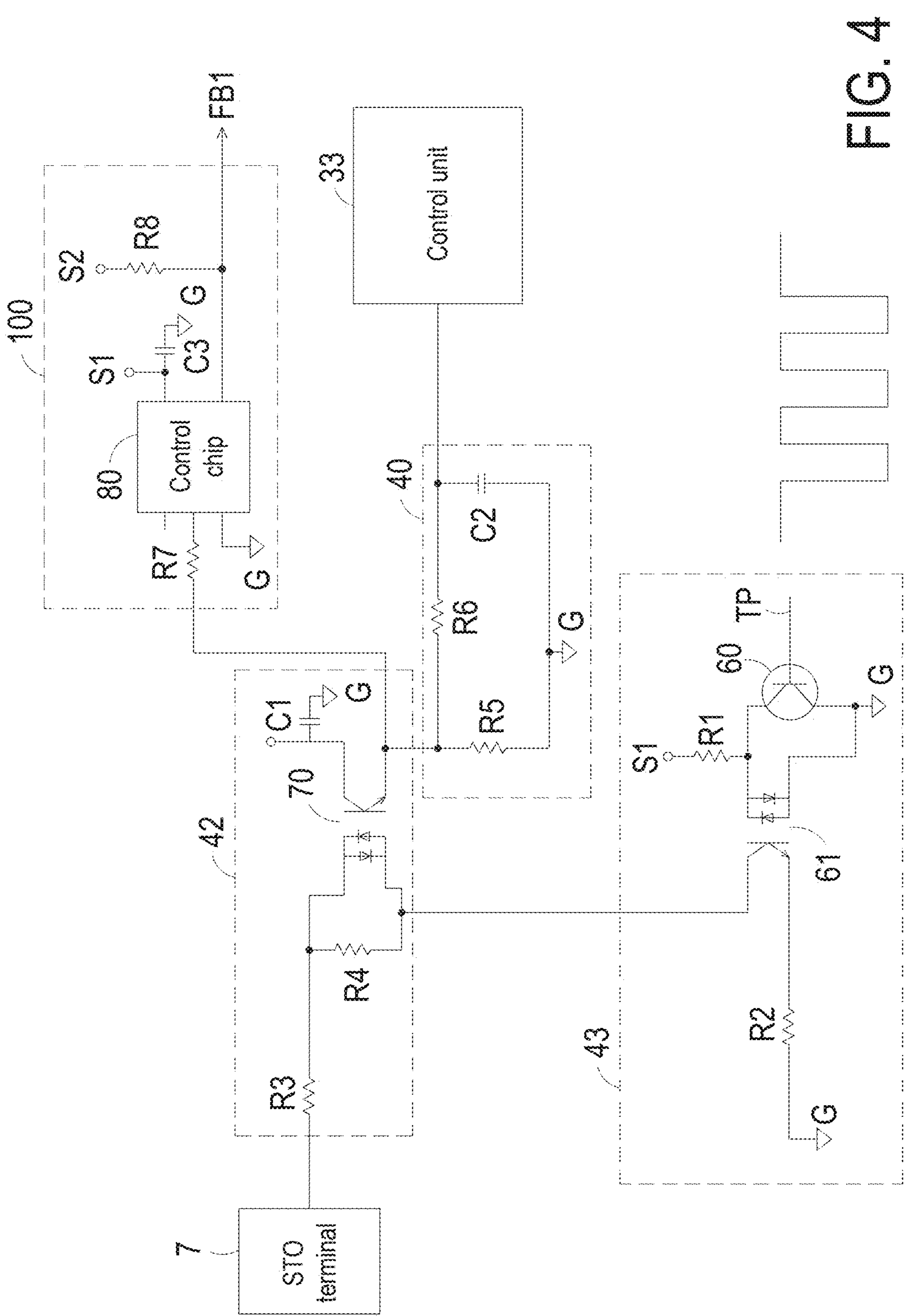
FIG. 4 is a schematic circuit diagram illustrating the circuitry topology of a portion of the motor control system shown in FIG. 1.

Please refer to FIGS. 1, 2, 3 and 4. FIG. 1 is a schematic circuit diagram illustrating the architecture of a motor control system according to an embodiment of the present invention. FIG. 2 is a schematic circuit diagram illustrating the architecture of the motor control system shown in FIG. 1 when the second photocoupler circuit and the fourth photocoupler circuit are turned on. FIG. 3 is a schematic circuit diagram illustrating the architecture of the motor control system shown in FIG. 1 when the second photocoupler circuit and the fourth photocoupler circuit are turned off. FIG. 4 is a schematic circuit diagram illustrating the circuitry topology of a portion of the motor control system shown in FIG. 1.

The motor control system 1 is used to drive the motor 2. The motor control system 1 includes a variable-frequency drive 3, a first safe torque off circuit (hereinafter referred to as a first STO circuit) 4, a second safe torque off circuit (hereinafter referred to as a second STO circuit) 5 and a pulse control module 6.

The variable-frequency drive 3 includes a first driving unit 30, a second driving unit 31 and a switching circuit 32. The switching circuit 32 includes a plurality of switching elements (not shown). When the first driving unit 30 is enabled, the first driving unit 30 drives the switching elements of the switching circuit 32. When the second driving unit 31 is enabled, the second driving unit 31 drives the switching elements of the switching circuit 32. The switching circuit 32 is electrically connected with the motor 2. Consequently, the variable-frequency drive 3 can convert the received input power into AC power and provide the AC power to the motor 2. In some embodiments, the first driving unit 30 drives the switching elements on the high-voltage side of the switching circuit 32, and the second driving unit 31 drives the switching elements on the low-voltage side of the switching circuit 32, but it is not limited thereto. In some embodiments, the variable-frequency drive 3 includes a control unit 33. The control unit 33 can detect the operating status of the variable-frequency drive 3. In addition, the operating status of the variable-frequency drive 3 is correspondingly controlled according to the detection result of the control unit 33. In addition, the first driving unit 30 and the second driving unit 31 are included in the control unit 33. It is noted that the first driving unit 30 and the second driving unit 31 are respectively one of a high-voltage driving unit, a lower-voltage driving unit, a power control driving unit and a control signal driving unit. The first driving unit 30 and the second driving unit 31 can be integrated into the control unit 33, but it is not limited thereto.

The first STO circuit 4 includes a first filter circuit 40, a first STO switch 41, a first photocoupler circuit 42 and a second photocoupler circuit 43. The photodiode of the first photocoupler circuit 42 and the phototransistor of the second photocoupler circuit 43 are connected with each other in series. The first STO switch 41 is electrically connected between the first driving unit 30 and the phototransistor of the first photocoupler circuit 42. The first filter circuit 40 is electrically connected with the phototransistor of the first photocoupler circuit 42. In some embodiments, the first driving unit 30 is one of a high-voltage driving unit, a lower-voltage driving unit, a power control driving unit and a control signal driving unit, but it is not limited thereto.

The second STO circuit 5 includes a second filter circuit 50, a second STO switch 51, a third photocoupler circuit 52 and a fourth photocoupler circuit 53. The photodiode of the third photocoupler circuit 52 and the phototransistor of the fourth photocoupler circuit 53 are connected with each other in series. The second STO switch 51 is electrically connected between the second driving unit 31 and the phototransistor of the third photocoupler circuit 52. The second filter circuit 50 is electrically connected with the phototransistor of the third photocoupler circuit 52. In some embodiments, the second driving unit 31 is one of a high-voltage driving unit, a lower-voltage driving unit, a power control driving unit and a control signal driving unit, but it is not limited thereto.

In some embodiments, the first driving unit 30 and the second driving unit 31 are different control units. In some embodiments, the first driving unit 30 is for example a high-voltage driving unit, and the second driving unit 31 is for example a low-voltage driving unit, but are not limited thereto.

The pulse control module 6 is electrically connected with the photodiode of the second photocoupler circuit 43 and the photodiode of the fourth photocoupler circuit 53. The pulse control module 6 issues a pulse signal TP to the photodiode of the second photocoupler circuit 43 and the photodiode of the fourth photocoupler circuit 53. In addition, the pulse control module 6 detects whether the first STO circuit 4 or the second STO circuit 5 is abnormal. The pulse signal TP is switched between a high voltage level state and a low voltage level state.

In some embodiments, the motor control system 1 further includes a STO terminal 7. The STO terminal 7 is electrically connected with the photodiode of the first photocoupler circuit 42 of the first STO circuit 4 and the photodiode of the third photocoupler circuit 52 of the second STO circuit 5. The STO terminal 7 provides a first STO control signal to the first STO circuit 4 and provides a second STO control signal to the second STO circuit 5. The on/off states of the first driving unit 30 are controlled according to the first STO control signal. The on/off states of the second driving unit 31 are controlled according to the second STO control signal. In some embodiments, the input power, such as 24V power, is provided through the STO terminal 7 to a safety power transmission device 8 inside the motor control system 1. Consequently, the safety power transmission device 8 supplies the input power from the STO terminal 7 to associated circuits or components inside the motor control system 1.

The motor control system 1 can be operated in a STO trigger mode or a STO self-test mode.

When the pulse control module 6 issues the pulse signal TP in the high voltage level state. In response to the pulse signal TP in the high voltage level state, the second photocoupler circuit 43 and the fourth photocoupler circuit 53 are turned on (e.g., in the situation of FIG. 2), the motor control system 1 enters the STO trigger mode. According to the first STO control signal and the second STO control signal, the on/off states of the first driving unit 30 and the on/off states of the second driving unit 31 are correspondingly controlled by the first STO circuit 4 and the second STO circuit 5. Consequently, the safe torque off function of the motor control system 1 is enabled.

When the pulse control module 6 issues the pulse signal TP in the low voltage level state. In response to the pulse signal TP in the low voltage level state, the second photocoupler circuit 43 and the fourth photocoupler circuit 53 are turned off (e.g., in the situation of FIG. 3), the motor control system 1 enters the STO self-test mode. Under this circumstance, the pulse signal TP outputted from the pulse control module 6 to the first photocoupler circuit 42 and the third photocoupler circuit 52 is filtered out by the first filter circuit 40 and the second filter circuit 50. Consequently, the first STO circuit 4 and the second STO circuit 5 aren't erroneously touched. Moreover, it is not necessary to consider the statuses of the first STO control signal and the second STO control signal received by the first STO circuit 4 and the second STO circuit 5. Furthermore, after the motor control system 1 enters the STO self-test mode, the pulse control module 6 detects whether the first STO circuit 4 or the second STO circuit 5 is abnormal.

In the first STO circuit 4 of the motor control system 1, the photodiode of the first photocoupler circuit 42 and the phototransistor of the second photocoupler circuit 43 are connected with each other in series. In the second STO circuit 5 of the motor control system 1, the photodiode of the third photocoupler circuit 52 and the phototransistor of the fourth photocoupler circuit 53 are connected with each other in series. Consequently, in the STO trigger mode or the STO self-test mode, the pulse control module 6 issues the corresponding pulse signal TP to directly control the on/off states of the second photocoupler circuit 43 and the on/off states of the fourth photocoupler circuit 53. In comparison with the conventional motor control system, the motor control system 1 of the present invention does not need an additional timing synchronization mechanism and two self-detection circuits. Consequently, the production cost of the motor control system 1 of the present invention is reduced. Moreover, since the motor control system 1 does not need to consider the statuses of the first STO control signal and the second STO control signal, the electrical short circuit and the misjudgment of the motor control system 1 when executing the safe torque off function are avoided.

As mentioned above, the pulse signal TP outputted from the pulse control module 6 to the first photocoupler circuit 42 and the third photocoupler circuit 52 is filtered out by the first filter circuit 40 and the second filter circuit 50. Consequently, the first STO circuit 4 and the second STO circuit 5 aren't erroneously touched, and the response time of the first STO circuit 4 and the second STO circuit 5 is largely increased. In this way, the safety of the motor control system 1 is improved.

Furthermore, the first filter circuit 40 and the second filter circuit 50 can help decoupling the circuits in the motor control system 1. Consequently, the control unit 33 can sample signals in real time.

Especially, the motor control system 1 of the present invention uses a dual-channel structure of the first STO circuit 4 and the second STO circuit 5. In the first STO circuit 4 of the motor control system 1, the photodiode of the first photocoupler circuit 42 and the phototransistor of the second photocoupler circuit 43 are connected with each other in series. In the second STO circuit 5 of the motor control system 1, the photodiode of the third photocoupler circuit 52 and the phototransistor of the fourth photocoupler circuit 53 are connected with each other in series. Consequently, the motor control system 1 satisfies the design of circuitry independence and the design of time independence. As for the circuitry independence, the first STO circuit 4 and the second STO circuit 5 are completely independent from each other. As for the time independence, the test timing of the first STO circuit 4 and the test timing of the second STO circuit 5 are staggered when the motor control system 1 is operated in the STO self-test mode.

In an embodiment, the motor control system 1 further includes a first detection circuit 100 and a second detection circuit 101.

The first detection circuit 100 is electrically connected with the phototransistor of the first photocoupler circuit 42. When the motor control system 1 is operated in the STO self-test mode, the first detection circuit 100 detects whether the signal from the phototransistor of the first photocoupler circuit 42 is correspondingly and synchronously changed with the change of the pulse signal TP. According to the detection result, the first detection circuit 100 generates a first detection signal FB1 to the pulse control module 6.

The second detection circuit 101 is electrically connected with the phototransistor of the third photocoupler circuit 52. When the motor control system 1 is operated in the STO self-test mode, the second detection circuit 101 detects whether the signal from the phototransistor of the third photocoupler circuit 52 is correspondingly and synchronously changed with the change of the pulse signal TP. According to the detection result, the second detection circuit 101 generates a second detection signal FB2 to the pulse control module 6.

If the signal from the phototransistor of the first photocoupler circuit 42 is not synchronously changed with the change of the pulse signal TP according to the first detection signal FB1, the pulse control module 6 determines that the first STO circuit 4 is abnormal. Similarly, if the signal from the phototransistor of the third photocoupler circuit 52 is not synchronously changed with the change of the pulse signal TP according to the second detection signal FB2, the pulse control module 6 determines that the second STO circuit 5 is abnormal. In case that the first STO circuit 4 or the second STO circuit 5 is abnormal, the pulse control module 6 disables the motor control system 1 so as to ensure the safety of the operations of the motor control system 1.

The first photocoupler circuit 42 and the third photocoupler circuit 52 have similar circuit structures and connection relationships. The second photocoupler circuit 43 and the fourth photocoupler circuit 53 have similar circuit structures and connection relationships. The first filter circuit 40 and the second filter circuit 50 have similar circuit structures and connection relationships. The first detection circuit 100 and the second detection circuit 101 have similar circuit structures and connection relationships. For succinctness, only the first photocoupler circuit 42, the second photocoupler circuit 43, the first filter circuit 40, the first detection circuit 100 and the control unit 33 are shown in FIG. 4, but the third photocoupler circuit 52, the fourth photocoupler circuit 53, the second filter circuit 50 and the second detection circuit 101 are not shown in FIG. 4.

In an embodiment, the second photocoupler circuit 43 includes an NPN transistor switch 60, a first resistor R1, a second resistor R2 and a second photocoupler circuit switch 61. The base of the NPN transistor switch 60 is electrically connected with the pulse control module 6 to receive the pulse signal TP. The emitter of the NPN transistor switch 60 is electrically connected with a reference terminal G. The collector of the NPN transistor switch 60 is electrically connected with the first terminal of the first resistor R1. The second terminal of the first resistor R1 is electrically connected with a first voltage source S1. The second photocoupler circuit switch 60 is composed of the photodiode and the phototransistor of the second photocoupler circuit 43. The anode of the second photocoupler circuit switch 61 is electrically connected with the first terminal of the first resistor R1. The cathode of the second photocoupler circuit switch 61 is electrically connected with the reference terminal G. The anode of the second photocoupler circuit switch 61 is electrically connected with the cathode of the first photocoupler circuit switch 70. The phototransistor of the second photocoupler circuit switch 61 is electrically connected between the first terminal of the second resistor R2 and the first photocoupler circuit 42. The second terminal of the second resistor R2 is electrically connected with the reference terminal G.

The first photocoupler circuit 42 includes a first capacitor C1, a first photocoupler circuit switch 70, a third resistor R3 and a fourth resistor R4. The first terminal of the third resistor R3 is electrically connected with the STO terminal 7 to receive the first STO control signal. The first terminal of the fourth resistor R4 is electrically connected with the second terminal of the third resistor R3. The cathode of the photodiode of the first photocoupler circuit switch 70 is electrically connected with the first terminal of the fourth resistor R4 and the second terminal of the third resistor R3. The anode of the photodiode of the first photocoupler circuit switch 70 is electrically connected with the second terminal of the fourth resistor R4 and the phototransistor of the second photocoupler circuit switch 61. The first photocoupler circuit switch 70 is composed of the photodiode and the phototransistor of the first photocoupler circuit 42. The anode of the first photocoupler circuit switch 70 is electrically connected with the cathode of the photodiode of the first photocoupler circuit switch 70. The cathode of the first photocoupler circuit switch 70 is electrically connected with the anode of the second photocoupler circuit switch 61. The emitter of the phototransistor of the first photocoupler circuit switch 70 is electrically connected with the first detection circuit 100. The collector of the phototransistor of the first photocoupler circuit switch 70 is electrically connected with the first voltage source S1. The first terminal of the first capacitor C1 is electrically connected with the first voltage source S1 and the collector of the phototransistor of the first photocoupler circuit switch 70. The second terminal of the first capacitor C1 is electrically connected with the reference terminal G.

The first filter circuit 40 is electrically connected with the emitter of the phototransistor of the first photocoupler circuit switch 70. In an embodiment, the first filter circuit 40 includes a fifth resistor R5, a sixth resistor R6 and a second capacitor C2. The first terminal of the fifth resistor R5 is electrically connected with the emitter of the phototransistor of the first photocoupler circuit switch 70. The second terminal of the fifth resistor R5 is electrically connected with the reference terminal G. The first terminal of the sixth resistor R6 is electrically connected with the first terminal of the fifth resistor R5. The second terminal of the sixth resistor R6 is electrically connected with the control unit 33. The second capacitor C2 is electrically connected between the second terminal of the sixth resistor R6 and the reference terminal G.

The first detection circuit 100 includes a control chip 80, a third capacitor C3, a seventh resistor R7 and an eighth resistor R8. The first terminal of the seventh resistor R7 is electrically connected with the emitter of the phototransistor of the first photocoupler circuit switch 70. The control chip 80 is electrically connected with the second terminal of the seventh resistor R7, the reference terminal G and the first voltage source S1. The control chip 80 detects whether the signal from the phototransistor of the first photocoupler circuit switch 70 of the first photocoupler circuit 42 is correspondingly and synchronously changed with the change of the pulse signal TP. According to the detection result, the output terminal of the control chip 80 outputs the first detection signal FB1 generated by the control chip 80 to the pulse control module 6. The first terminal of the third capacitor C3 is electrically connected with the first voltage source S1 and the control chip 80. The second terminal of the third capacitor C3 is electrically connected with the reference terminal G. The first terminal of the eighth resistor R8 is electrically connected with a second voltage source S2, and the second terminal of the eighth resistor R8 is electrically connected with the output terminal of the control chip 80.

From the above descriptions, the present invention provides the motor control system. In the first STO circuit of the motor control system, the photodiode of the first photocoupler circuit and the phototransistor of the second photocoupler circuit are connected with each other in series. In the second STO circuit of the motor control system, the photodiode of the third photocoupler circuit and the phototransistor of the fourth photocoupler circuit are connected with each other in series. Consequently, in the STO trigger mode or the STO self-test mode, the pulse control module issues the corresponding pulse signal TP to directly control the on/off states of the second photocoupler circuit and the on/off states of the fourth photocoupler circuit. In comparison with the conventional motor control system, the motor control system of the present invention does not need an additional timing synchronization mechanism and two self-detection circuits. Consequently, the production cost of the motor control system of the present invention is reduced. Moreover, since the motor control system does not need to consider the statuses of the first STO control signal and the second STO control signal, the electrical short circuit and the misjudgment of the motor control system when executing the safe torque off function are avoided.

In the STO self-test mode, the pulse signal outputted from the pulse control module to the first photocoupler circuit and the third photocoupler circuit is filtered out by the first filter circuit and the second filter circuit. Consequently, the first STO circuit and the second STO circuit aren't erroneously touched, and the response time of the first STO circuit and the second STO circuit is largely increased. In this way, the safety of the motor control system is improved.

Furthermore, the first filter circuit and the second filter circuit can help decoupling the circuits in the motor control system. Consequently, the control unit can sample signals in real time. Especially, the motor control system of the present invention uses a dual-channel structure of the first STO circuit and the second STO circuit. In the first STO circuit of the motor control system, the photodiode of the first photocoupler circuit and the phototransistor of the second photocoupler circuit are connected with each other in series. In the second STO circuit of the motor control system, the photodiode of the third photocoupler circuit and the phototransistor of the fourth photocoupler circuit are connected with each other in series. Consequently, the motor control system satisfies the design of circuitry independence and the design of time independence.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor control system for driving a motor, comprising:

a variable-frequency drive electrically connected with the motor, and comprising a first driving unit and a second driving unit, wherein when the first driving unit or the second driving unit is enabled, the variable-frequency drive provides an AC power to the motor;

a first safe torque off (STO) circuit comprising a first filter circuit, a first STO switch, a first photocoupler circuit and a second photocoupler circuit, wherein the first filter circuit is electrically connected with the first photocoupler circuit, the first STO switch is electrically connected with the first driving unit and a phototransistor of the first photocoupler circuit, and a photodiode of the first photocoupler circuit and a phototransistor of the second photocoupler circuit are connected with each other in series;

a second STO circuit comprising a second filter circuit, a second STO switch, a third photocoupler circuit and a fourth photocoupler circuit, wherein the second filter circuit is electrically connected with the third photocoupler circuit, the second STO switch is electrically connected with the second driving unit and a phototransistor of the third photocoupler circuit, and a photodiode of the third photocoupler circuit and a phototransistor of the fourth photocoupler circuit are connected with each other in series; and a pulse control module electrically connected with a photodiode of the second photocoupler circuit and a photodiode of the fourth photocoupler circuit, wherein the pulse control module issues a pulse signal to the photodiode of the second photocoupler circuit and the photodiode of the fourth photocoupler circuit and detects whether the first STO circuit or the second STO circuit is abnormal, wherein the pulse signal is switched between a high voltage level state and a low voltage level state;

wherein when the pulse control module issues the pulse signal in the high voltage level state, the second photocoupler circuit and the fourth photocoupler circuit are turned on, the motor control system is operated in a STO trigger mode, and wherein when the pulse control module issues the pulse signal in the low voltage level state, the second photocoupler circuit and the fourth photocoupler circuit are turned off, the motor control system is operated in a STO self-test mode.

2. The motor control system according to claim 1, further comprising:

a first detection circuit electrically connected with the phototransistor of the first photocoupler circuit, wherein when the motor control system is operated in the STO self-test mode, the first detection circuit detects whether a signal from the phototransistor of the first photocoupler circuit is correspondingly and synchronously changed with a change of the pulse signal and generates a first detection result, wherein the first detection circuit generates a first detection signal to the pulse control module according to the first detection result.

3. The motor control system according to claim 2, further comprising:

a second detection circuit electrically connected with the phototransistor of the third photocoupler circuit, wherein when the motor control system is operated in the STO self-test mode, the second detection circuit detects whether a signal from the phototransistor of the third photocoupler circuit is correspondingly and synchronously changed with the change of the pulse signal and generates a second detection result, wherein the second detection circuit generates a second detection signal to the pulse control module according to the second detection result.

4. The motor control system according to claim 3, wherein the variable-frequency drive comprises a control unit electrically connected with the first filter circuit and the second filter circuit and configured to detect an operating status of the variable-frequency drive and generate a detection result, and the variable-frequency drive is correspondingly controlled by the control unit according to the detection result.

5. The motor control system according to claim 4, wherein the first driving unit and the second driving unit are included in the control unit.

6. The motor control system according to claim 3, wherein when the signal from the phototransistor of the first photocoupler circuit is not synchronously changed with the change of the pulse signal according to the first detection signal, or when the signal from the phototransistor of the third photocoupler circuit is not synchronously changed with the change of the pulse signal according to the second detection signal, the pulse control module disables the motor control system.

7. The motor control system according to claim 1, wherein the second photocoupler circuit comprises:

an NPN transistor switch, wherein a base of the NPN transistor switch is electrically connected with the pulse control module to receive the pulse signal, and an emitter of the NPN transistor switch is electrically connected with a reference terminal;

a first resistor, wherein a first terminal of the first resistor is electrically connected with a collector of the NPN transistor switch, and a second terminal of the first resistor is electrically connected with a first voltage source;

a second resistor comprising a first terminal and a second terminal, wherein the second terminal of the second resistor is electrically connected with the reference terminal; and a second photocoupler circuit switch, wherein an anode of the second photocoupler circuit switch is electrically connected with the first terminal of the first resistor, and a cathode of the second photocoupler circuit switch is electrically connected with the reference terminal, wherein the second photocoupler circuit switch is composed of the photodiode and the phototransistor of the second photocoupler circuit, wherein the phototransistor of the second photocoupler circuit switch is electrically connected between the first terminal of the second resistor and the first photocoupler circuit.

8. The motor control system according to claim 7, further comprising a first detection circuit electrically connected with the phototransistor of the first photocoupler circuit, wherein the first photocoupler circuit comprises:

a third resistor, wherein a first terminal of the third resistor receives a first STO control signal;

a fourth resistor, wherein a first terminal of the fourth resistor is electrically connected with a second terminal of the third resistor;

a first photocoupler circuit switch electrically connected with the second photocoupler circuit switch and composed of the photodiode and the phototransistor of the first photocoupler circuit, wherein a cathode of the photodiode of the first photocoupler circuit switch is electrically connected with the first terminal of the fourth resistor and the second terminal of the third resistor, an anode of the photodiode of the first photocoupler circuit switch is electrically connected with a second terminal of the fourth resistor and the phototransistor of the second photocoupler circuit switch, an anode of the photodiode of the second photocoupler circuit switch is electrically connected with the cathode of the photodiode of the first photocoupler circuit switch, a cathode of the photodiode of the second photocoupler circuit switch is electrically connected with the anode of the photodiode of the first photocoupler circuit switch, an emitter of the phototransistor of the first photocoupler circuit switch is electrically connected with the first detection circuit, and a collector of the phototransistor of the first photocoupler circuit switch is electrically connected with the first voltage source; and a first capacitor, wherein a first terminal of the first capacitor is electrically connected with the first voltage source and the collector of the phototransistor of the first photocoupler circuit switch, and a second terminal of the first capacitor is electrically connected with the reference terminal.

9. The motor control system according to claim 8, wherein the first filter circuit is electrically connected with the emitter of the phototransistor of the first photocoupler circuit switch, and the first filter circuit comprises:

a fifth resistor, wherein a first terminal of the fifth resistor is electrically connected with the emitter of the phototransistor of the first photocoupler circuit switch, and a second terminal of the fifth resistor is electrically connected with the reference terminal;

a sixth resistor, wherein a first terminal of the sixth resistor is electrically connected with the first terminal of the fifth resistor, and a second terminal of the sixth resistor is electrically connected with a control unit; and a second capacitor electrically connected between the second terminal of the sixth resistor and the reference terminal.

10. The motor control system according to claim 9, wherein the first detection circuit comprises:

a seventh resistor, wherein a first terminal of the seventh resistor is electrically connected with the emitter of the phototransistor of the first photocoupler circuit switch;

a control chip electrically connected with a second terminal of the seventh resistor, the reference terminal and the first voltage source, wherein the control chip detects whether a signal from the phototransistor of the first photocoupler circuit switch is correspondingly and synchronously changed with the change of the pulse signal and generates the first detection result, and an output terminal of the control chip outputs the first detection signal according to the first detection result;

a third capacitor, wherein a first terminal of the third capacitor is electrically connected with the first voltage source and the control chip, and a second terminal of the third capacitor is electrically connected with the reference terminal; and an eighth resistor, wherein a first terminal of the eighth resistor is electrically connected with a second voltage source, and a second terminal of the eighth resistor is electrically connected with the output terminal of the control chip.

11. The motor control system according to claim 1, wherein the first driving unit and the second driving unit are two selected from the group consisting of a high-voltage driving unit, a low-voltage driving unit, a power control driving unit and a control signal driving unit.

12. The motor control system according to claim 1, wherein when the motor control system is in the STO trigger mode, the first STO circuit controls on/off states of the first driving unit according to a first STO control signal, and the second STO circuit controls on/off states of the second driving unit according to a second STO control signal.

13. The motor control system according to claim 1, wherein when the motor control system is in the STO self-test mode, the pulse signal in the first photocoupler circuit and the pulse signal in the third photocoupler circuit are respectively filtered out by the first filter circuit and the second filter circuit, and the pulse control module detects whether the first STO circuit or the second STO circuit is abnormal.

* * * * *